US006970728B2

(12) United States Patent
Chenoweth et al.

(10) Patent No.: US 6,970,728 B2
(45) Date of Patent: Nov. 29, 2005

(54) EXTENDED ANTENNA SUPPORT FOR A WIRELESS COMMUNICATIONS DEVICE

(75) Inventors: John P. Chenoweth, Coral Springs, FL (US); Alejandro Candal, Davie, FL (US); David Hartley Minasi, Fort Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 258 days.

(21) Appl. No.: 10/426,112

(22) Filed: Apr. 29, 2003

(65) Prior Publication Data

US 2004/0219958 A1 Nov. 4, 2004

(51) Int. Cl.[7] .............................................. H04M 1/00

(52) U.S. Cl. .............................. 455/575.7; 455/575.3; 455/575.1; 455/550.1

(58) Field of Search ....................... 455/575.7, 575.3, 455/575.1, 550.1, 552.1, 553.1, 575.8, 90.3; 343/702

(56) References Cited

U.S. PATENT DOCUMENTS

| 5,561,436 | A | * | 10/1996 | Phillips | 343/702 |
| 6,246,374 | B1 | * | 6/2001 | Perrotta et al. | 343/702 |
| 6,272,324 | B1 | * | 8/2001 | Rudisill et al. | 455/575.8 |
| 2001/0008839 | A1 | * | 7/2001 | Cho | 455/550 |

* cited by examiner

Primary Examiner—Nick Corsaro
Assistant Examiner—Lewis West
(74) Attorney, Agent, or Firm—Scott M. Garrett

(57) ABSTRACT

A wireless communications device (102) includes a flip assembly 106 that includes a speaker (120) and that has a GPS antenna (104) mounted about a far edge. The flip assembly (106) further has a GPS RF amplifier (314) mounted adjacent to the GPS antenna (104) for amplifying signals received by the GPS antenna (104) and providing those amplified signals to a GPS RF stripline (312). The GPS RF stripline (312) includes a flexible RF stripline (404) to accommodate rotationally opening and closing of the flip assembly (106). Positioning of the GPS antenna (104) about the far edge of the flip assembly (106) removes the GPS antenna from a main housing assembly (108) of the wireless communications device (102) and provides for better GPS signal reception performance.

11 Claims, 2 Drawing Sheets

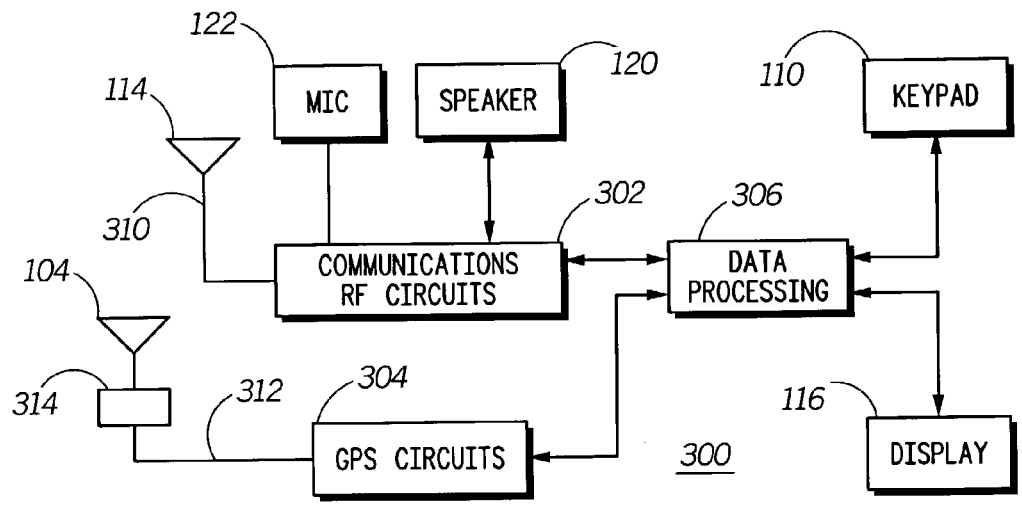
FIG. 3
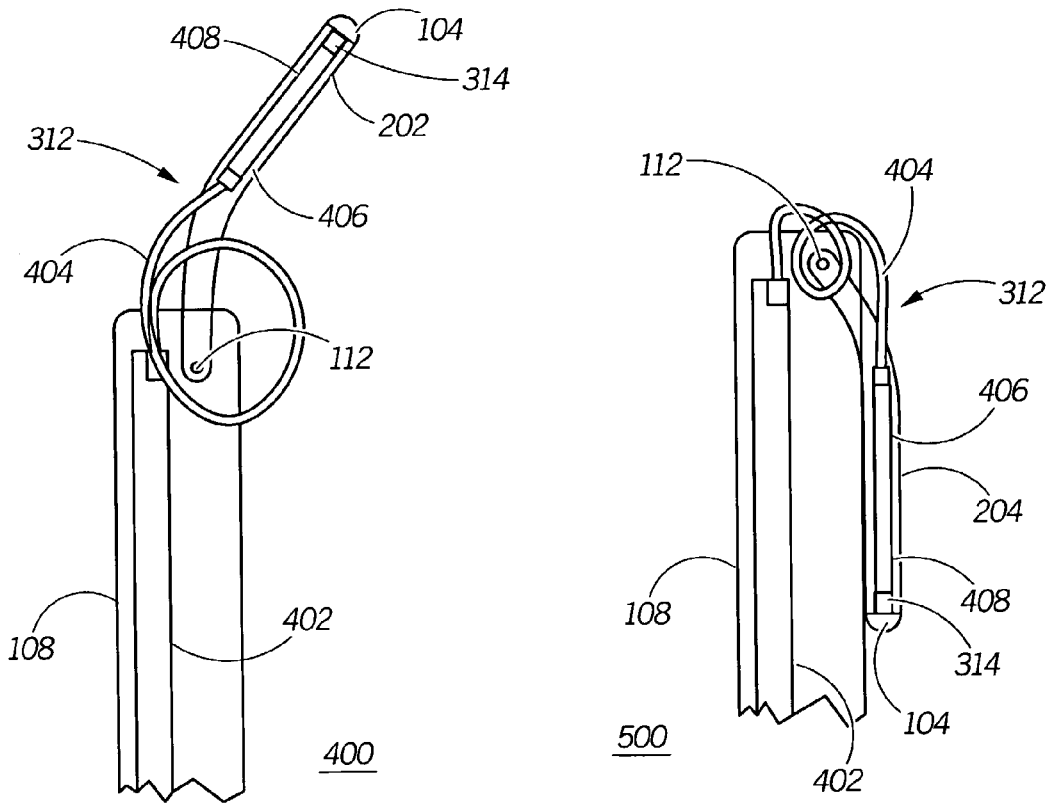
FIG. 4     FIG. 5

EXTENDED ANTENNA SUPPORT FOR A WIRELESS COMMUNICATIONS DEVICE

FIELD OF THE INVENTION

The present invention generally relates to the field of wireless communications devices and more particularly relates to antenna structures for such devices.

BACKGROUND OF THE INVENTION

Wireless communications devices, such as cellular phones, have become increasingly smaller with advances in electronic device technology. This reduction in size has complicated the placement of adequate antenna structures on these devices to provide proper wireless connectivity.

The integration of multiple radio functions into a single device, such as the incorporation of a Global Positioning Receiver (GPS) into a cellular phone, has resulted in further design difficulties. The antenna design problem of portable communications devices is often complicated by the use of metallic structures instead of plastic in the wireless communications device housing in order to decrease the physical volume of the device while maintaining structural strength, RF signal shielding, and electrostatic protection properties for the device. A common cellular phone design motif has a metal battery cover that extends over most of the phone's back. This large piece of metal causes poor GPS signal reception performance for most antennas, which are often mounted on the printed circuit board located in the main housing of wireless communications device. In addition to blockage by the metal battery door, a GPS antenna in this area is subject to the deleterious reception performance effects on the GPS antenna of the battery and the user's hand.

Therefore a need exists to overcome the problems with the prior art as discussed above.

SUMMARY OF THE INVENTION

According to a preferred embodiment of the present invention, a wireless communications device has an auxiliary RF circuit. The wireless communications device further has a first portion that contains at least a portion of the auxiliary RF circuit. The wireless communication device also has a second portion that comprises a first end and a second end, wherein the second end is substantially opposite the first end. The wireless communications device further has a rotational joint for rotationally coupling the first edge of the second portion to the first portion. The wireless communications device also has an auxiliary antenna that is electrically connected to the auxiliary RF circuit and that is mounted along the second edge of the second portion.

According to another aspect of the preferred embodiments, an auxiliary antenna support for positioning an auxiliary antenna relative to a wireless device has a structure that has a first edge and a second edge, where the second edge is substantially opposite the first edge. The auxiliary antenna support further has a mounting point that is located on the first edge of the structure and that is adapted for securing the structure to a wireless communications device. The auxiliary antenna support also contains an audio transducer that is suitable for supporting voice communications in conjunction with the wireless communications device. The auxiliary antenna support further has an auxiliary antenna for receiving an auxiliary RF signal. This auxiliary antenna is located on the second edge of the structure.

According to a preferred embodiment, a cellular telephone utilizes the significant advantages of the present invention.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 3 is a block diagram of the electronic circuitry of the wireless communications device of FIG. 1, according to a preferred embodiment of the present invention.

FIG. 4 is an expanded side view of the wireless communications device illustrating an open position of the rotational joint of the wireless communications device, according to a preferred embodiment of the present invention.

FIG. 5 is an expanded side view of the wireless communications device illustrating a closed position of the rotational joint of the wireless communications device, according to a preferred embodiment of the present invention.

DETAILED DESCRIPTION

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The present invention, according to a preferred embodiment, overcomes problems with the prior art by providing a wireless communications device, such as in the form of a cellular telephone, that has a physical design similar to a conventional "flip-phone" with a main housing assembly and a "flip" assembly that is mechanically coupled to the main housing assembly via a rotational joint. This wireless communications device includes a GPS receiver in addition to the conventional cellular telephone communication transceiver. The GPS antenna is preferably mounted about the far end edge region of the flip assembly of this wireless communications device so as to provide a superior reception performance. The inventors have measured a 2–3 dB improvement in signal reception performance for GPS antennas that use such mounting. This is a significant advantage of the present invention.

Figure 1:
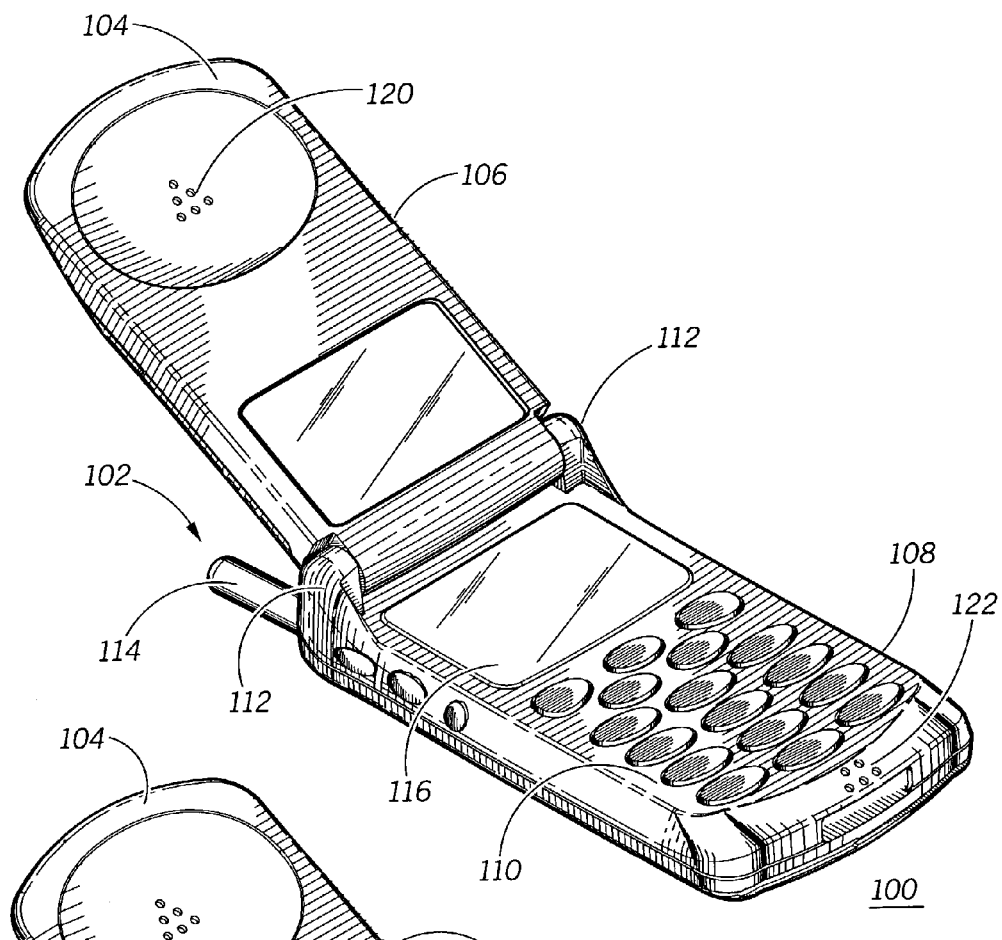
FIG. 1 is a front view of a wireless communications device, according to a preferred embodiment of the present invention.

A front view 100 of a cellular phone 102 according to an exemplary embodiment of the present invention is illustrated in FIG. 1. The construction of the exemplary cellular phone 102 is similar to a conventional flip-phone and has a main housing assembly 108 and a flip assembly 106. A bottom end of the flip assembly 106 is mechanically coupled to the main housing assembly 108 via a rotational joint 112. The rotational joint 112 allows the flip assembly 106 to be rotated around the axis of rotational joint 112 and folded over onto a top surface of the main housing assembly 108.

Preferably, the flip assembly 106 is rotated away from the main housing assembly 108 to provide an open position for the cellular phone 102 that is convenient for a user to use the flip phone as a cellular telephone, in a manner well known in the art. Additionally, the flip assembly 106 is preferably rotated to a second closed position that results in the flip assembly 106 to be folded over onto a top surface of the main housing assembly 108. This results in a compact arrangement for the wireless communications device, or cellular phone 102 in this example. The compact arrangement is convenient for the user to carry or store the cellular phone 102.

The front of the main housing assembly 108 contains a conventional keypad 110 constituting a user input interface for the cellular phone 102 for a user to provide user input to the cellular phone 102. The front of the main housing assembly 108 further has a microphone 122 to pick up a user's voice when the cellular phone 102 is in use. This microphone 122 is located about a mouthpiece region of the cellular phone 102 for receiving voice audio from the mouth of a user of the cellular phone 102. The front of the main housing assembly 108 further has an alpha-numeric display 116 to provide visual information to the user of the cellular phone 102.

The main housing assembly 108 of the exemplary embodiment further has a communications antenna 114 that is used for wireless transmission of communications signals from the cellular phone 102 and wireless reception of communications signals to the cellular phone 102. The main housing assembly 108 of the exemplary embodiment, as is common with conventional flip-phones, has a mass of conductive materials, such as circuit boards, batteries, displays and even metallic housing components, that would typically interfere with the operation of an antenna placed within or in close proximity to the main housing assembly 108.

The flip assembly 106 of the exemplary embodiment contains a speaker 120, as is common in conventional flip-phone designs. This speaker 120 is located about an earpiece region of the cellular phone 102 for providing received audio to an ear of a user of the cellular phone 102. A GPS antenna 104 that is preferably mounted about the far end edge region of the flip assembly 106, which is the end opposite the bottom end that is attached to the main housing assembly 108 by means of a rotational joint 112, of the exemplary embodiment.

The GPS antenna 104 is more preferably located about the outer far end edge region of the flip assembly 106 and generally closer to the far end edge than the earpiece region. This preferred location preferably places the GPS antenna 104 substantially at a region located at the highest elevation of the cellular phone 102 and above a user's ear when in normal use. This location of the GPS antenna 104 has been found by the inventors to increase the receive sensitivity by approximately 2 to 3 dB improvement in signal reception performance for a GPS antenna 104 which is a significant improvement over a more conventional location for a GPS antenna about the main housing assembly 108.

Figure 2:
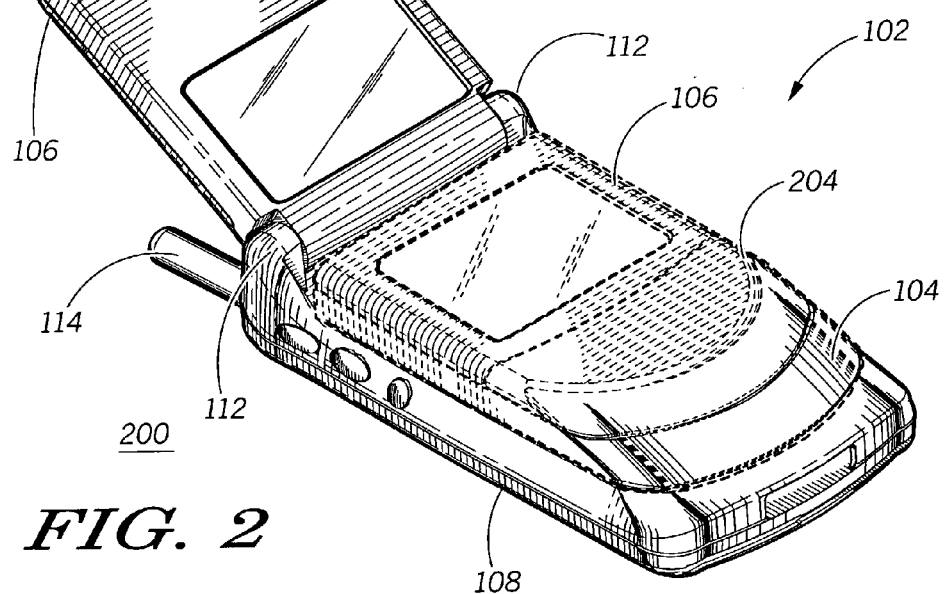
FIG. 2 is a side view of the wireless communications device of FIG. 1, illustrating a rotational joint mechanically coupling a first portion and a second portion of the wireless communications device, according to a preferred embodiment of the present invention.

A side view 200 of the cellular phone 102 of an exemplary embodiment of the present invention is illustrated in FIG. 2. The side view 200 shows the flip assembly 106 in both of its two common positions—as an open flip assembly 202 and as a closed flip assembly 204 (indicated by the dashed lines). The flip assembly 106 is positioned as a closed flip assembly 204 when the cellular phone 102 is typically not in use by a user. This decreases the size of the cellular phone 102 and facilitates carrying and storing the cellular phone 102. The flip assembly 106 is positioned as an open flip assembly 202 in order to use the cellular phone 102. This places the GPS antenna 104 at a point far from the main housing assembly 108 and minimizes the effect of the main housing assembly 108 on the receive performance of the GPS antenna 104.

A circuit block diagram 300 of a cellular phone 102, according to an embodiment of the present invention, is illustrated in FIG. 3. The cellular phone 102 of the exemplary embodiment has a communications RF circuit module 302. The communications RF circuit module 302 performs the RF generation and reception functions required to support the voice and/or data communications of cellular phone 102. The communications RF circuits 302 are communicatively coupled to the microphone 122 and speaker 120 to provide cellular telephone functions. The communications RF circuits 302 are connected to the communications antenna 114 via a communications RF transmission line 310. The communications antenna 114 and communications RF transmission line 310 support reception and transmission of RF signals used for communications with the cellular phone 102. The data processing circuits 306 in the exemplary embodiment control the communications RF circuits 302.

The cellular phone 102 also includes GPS receiver circuits 304. The GPS receiver circuits 304 are connected to a GPS RF amplifier 314 via a GPS signal transmission line 312. The GPS signal transmission line 312 may comprise any combination of stripline, co-planar waveguide, coaxial cable, and flexible stripline (e.g., an RF flex circuit). The GPS RF amplifier 314 amplifies signals received by the GPS antenna 104 in order to overcome losses of the GPS RF transmission line 312 and the internal noise of GPS receiver circuits 304. The GPS receiver circuits 304 accept GPS signals received via the GPS antenna 104, amplified by the GPS RF amplifier 314, and transferred by the GPS signal transmission line 312. The GPS receiver circuits 304 produce data signals indicating a geographic location of the cellular phone 102. The data signals are coupled to the data processing circuits 306.

The data processing circuits 306, according to the present example, include a processor, volatile memory, non-volatile memory, and associated logic circuits. The cellular phone 102, for example, uses geographic location, indicated by the data signals, to support emergency 911 calls and other functions incorporated into existing cellular phones and cellular phone systems. The geographic location produced by the GPS receiver circuits 304 is coupled to the data processing circuits 306 in the exemplary embodiment which then process these data signals and store into a memory (not shown) the geographic location information for the cellular phone 102.

As discussed above, the cellular phone 102 has data processing circuits 306. The data processing circuits 306 of the exemplary embodiment contain a programmable processor and memory to implement data processing functions and other control functions of the cellular phone 102. The data processing circuits 306 are communicatively coupled to the keypad 110 and to the display 116 in the exemplary embodiment in order to support user input and user output functions.

Referring to FIG. 4, an expanded side view 400 of the cellular phone 102 is shown illustrating an open position of a rotational joint 112 of the cellular phone 102, e.g., showing an open flip assembly 202, according to an exemplary embodiment of the present invention. The expanded view 400 also shows a cut-away view of the main housing assembly 108. The main housing assembly 108 includes a circuit board 402. The circuit board 402 of the exemplary embodiment includes RF, digital and data processing circuits that are used to process communications signals as well as received GPS signals. The open flip assembly 202, which is the flip assembly 106 in the open position, is shown as attached to the main housing assembly by rotational joint 112. The GPS antenna 104 is shown with an adjacent GPS RF amplifier 314.

The GPS RF amplifier 314 amplifies RF signals received by the GPS antenna 104 to improve performance and to overcome signal losses introduced by the GPS signal transmission line 312. The signal produced at the output of the GPS RF amplifier 314 is provided to the input of the GPS transmission line 312. The GPS transmission line 312 of the exemplary embodiment consists of a fixed RF stripline (having an input portion 408 and an output portion 406) and a flexible RF stripline 404 (e.g., RF flex circuit). The input 408 of the fixed RF stripline being electrically coupled to the output of the GPS RF amplifier 314 and the output 406 of the fixed RF stripline being electrically coupled to the flexible RF stripline 404. The fixed RF stripline 408 is preferably integrally secured to the flip assembly 106 of the exemplary embodiment.

A first end portion 408 of the fixed RF stripline includes an input connected to the RF output of the GPS RF amplifier 314, which is at the upper end region of the flip assembly 106. A second end portion 406 of the fixed RF stripline includes an output and is located at the bottom end region of the flip assembly 106 and that is opposite the upper end region of the flip assembly 106 and the GPS antenna 104.

This second end portion of the fixed RF stripline 408 is electrically connected to an input of a flexible GPS RF stripline 404. The output of the flexible GPS RF stripline 404 is electrically connected to the circuit board 402 at a point that corresponds to the RF input of the GPS receiver circuits 304. The flexible GPS RF stripline 404 is configured to accommodate movement of the flip assembly 106, about the rotational joint 112 so that the flip assembly 106 is able to rotationally move from the open position, corresponding to the open flip assembly 202, to the closed position, corresponding to the closed flip assembly 204. The flexible GPS RF stripline 404 has the advantage that it is easy to attach to the other electrical circuit structures such as the circuit board 402 and to the fixed RF stripline 408. The open rotational joint expanded view 400 shows the flexible GPS RF stripline 404 as having a slightly flexible bulge to accommodate the movement of the flip assembly 106.

A closed rotational joint expanded view 500, which shows an expanded view of a cellular phone 102 with a closed flip assembly 202, according to an exemplary embodiment of the present invention is illustrated in FIG. 5. The closed rotational joint expanded view 500 shows the flip assembly 106 in the closed position and illustrates how the flexible GPS RF stripline 404 bends with the contour of the flip assembly 106 moving from the position shown in the open rotational joint expanded view 400 to accommodate the repositioning of the flip assembly 106 from the position of the open flip assembly 202 to the closed flip assembly 204.

As discussed above, with reference to the exemplary embodiment of the present invention, locating the GPS antenna 104 about the far end edge region of the flip assembly 106 of a wireless communications device 102, provides a superior reception performance for the GPS receiver 304. The inventors have measured a 2-3 dB improvement in signal reception performance for such GPS antenna 104 and GPS receiver 304 assembly. This is a significant advantage of the present invention over any known prior art wireless communications devices.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A wireless communications device, comprising:
   an auxiliary RF circuit;
   a first portion, wherein the first portion contains at least a portion of the auxiliary RF circuit;
   a second portion, comprising a first edge and a second edge, wherein the second edge is substantially opposite the first edge, and further comprising an earpiece;
   a rotational joint for rotationally coupling the first edge of the second portion to the first portion; and
   an auxiliary antenna, electrically connected to the auxiliary RF circuit, wherein the auxiliary antenna is located between the second edge of the second portion and the earpiece, and wherein a portion of the auxiliary RF circuit located in the second portion comprises an RF active receiving and amplifying circuit electrically coupled and adjacent to the auxiliary antenna.

2. The wireless communications device according to claim 1, further comprising an RF transmission line for electrically coupling the auxiliary antenna to the auxiliary RF circuit, wherein the RF transmission line comprises a flexible circuit adapted to allow rotation of the rotational joint while maintaining electrical coupling between the auxiliary antenna and the auxiliary RF circuit.

3. The wireless communications device according to claim 1, further comprising a GPS receiver substantially in the first portion and electrically coupled to the auxiliary antenna in the second portion.

4. The wireless communications device according to claim 1, wherein the auxiliary antenna is located about the second edge of the second portion and closer to the second edge than the earpiece.

5. An auxiliary antenna support for positioning an auxiliary antenna relative to a wireless communications device, comprising:
   a structure comprising a first edge and a second edge, wherein the second edge is substantially opposite the first edge, and further comprising an earpeice;
   a rotational joint, mechanically coupled about the first edge of the structure, and adapted for rotationally securing the structure to a wireless communications device; and
   an auxiliary antenna for receiving auxiliary RF signal, wherein the auxiliary antenna is located between the second edge of the structure and the earpiece, the auxiliary antenna being electrically coupled to an RF active receiving and amplifying circuit located in the structure and adjacent to the auxiliary antenna.

6. The auxiliary antenna support of claim 5, further comprising a flexible RF circuit electrically coupled to the electrical contact about the first edge of the structure for flexibly electrically coupling the auxiliary antenna about the rotational joint and to an RF receiver located in the wireless communications device.

7. The auxiliary antenna support of claim 5, wherein the auxiliary antenna is located about the second edge of the second portion and closer to the second edge than the earpiece.

8. A cellular flip-phone comprising:
   a cellular phone housing containing a wireless receiver circuit;
   a flip portion including a first edge, and a second edge and an earpiece, wherein the second edge is substantially opposite the first edge;
   a rotational joint for rotationally coupling the first edge of the flip portion to the cellular phone housing; and
   an antenna, electrically coupled to the wireless receiver circuit, wherein the antenna is located between the second edge of the flip portion and the earpiece, and wherein the antenna being electrically coupled to an RF active receiving and amplifying circuit in the flip portion and adjacent to the antenna.

9. The cellular flip-phone of claim 8, further comprising a transmission line for electrically coupling the antenna to the wireless receiver circuit, wherein the transmission line comprises a flexible circuit adapted to allow rotation of the rotational joint while maintaining electrical coupling between the antenna and the wireless receiver circuit.

10. The cellular flip-phone of claim 8, wherein the wireless receiver circuit comprises a GPS receiver substantially located in the cellular phone housing and electrically coupled to the antenna in the flip portion.

11. The cellular flip-phone of claim 8, wherein the antenna is located about the second edge of the flip portion and closer to the second edge than the earpiece.

* * * * *